(12) United States Patent
Aryan

(10) Patent No.: US 11,860,677 B2
(45) Date of Patent: Jan. 2, 2024

(54) METHODS AND SYSTEMS FOR MANAGING MEDIA CONTENT IN A PLAYBACK QUEUE

(71) Applicant: Melodia, Inc., Palo Alto, CA (US)

(72) Inventor: Omid Aryan, Palo Alto, CA (US)

(73) Assignee: Melodia, Inc., Palo Alto, CA (US)

( * ) Notice: Subject to any disclaimer, the term of this patent is extended or adjusted under 35 U.S.C. 154(b) by 207 days.

(21) Appl. No.: 17/468,641

(22) Filed: Sep. 7, 2021

(65) Prior Publication Data

US 2022/0067088 A1 Mar. 3, 2022

Related U.S. Application Data

(63) Continuation-in-part of application No. 15/711,656, filed on Sep. 21, 2017, now Pat. No. 11,138,262.

(60) Provisional application No. 63/075,170, filed on Sep. 6, 2020, provisional application No. 62/397,824, filed on Sep. 21, 2016.

(51) Int. Cl.
*G06F 16/00* (2019.01)
*G06F 16/635* (2019.01)
*G06F 16/638* (2019.01)

(52) U.S. Cl.
CPC .......... *G06F 16/636* (2019.01); *G06F 16/637* (2019.01); *G06F 16/639* (2019.01)

(58) Field of Classification Search
CPC ..... G06F 16/636; G06F 16/637; G06F 16/639
See application file for complete search history.

(56) References Cited

U.S. PATENT DOCUMENTS

| | | | |
|---|---|---|---|
| 8,204,890 B1 * | 6/2012 | Gogan | G06F 16/4387 709/201 |
| 8,620,662 B2 | 12/2013 | Bellegarda | |
| 9,355,174 B2 * | 5/2016 | Moss | G06F 16/24578 |
| 9,510,050 B2 | 11/2016 | Mukherjee | |
| 11,138,262 B2 | 10/2021 | Aryan | |
| 2003/0135582 A1 | 7/2003 | Allen | |
| 2012/0054178 A1 | 3/2012 | Tran | |
| 2012/0117026 A1 * | 5/2012 | Cassidy | G06F 16/4387 707/634 |
| 2012/0191686 A1 * | 7/2012 | Hjelm | G06F 16/48 707/706 |
| 2013/0017519 A1 | 1/2013 | Leshed | |
| 2013/0194066 A1 | 8/2013 | Rahman | |
| 2013/0282808 A1 | 10/2013 | Sadanandan | |
| 2015/0120648 A1 | 4/2015 | Slovacek | |
| 2015/0264439 A1 | 9/2015 | Karlin | |

(Continued)

*Primary Examiner* — Debbie M Le
(74) *Attorney, Agent, or Firm* — MAHAMEDI IP LAW LLP

(57) ABSTRACT

A computer-implemented method and system for managing media content in a playback queue. A processing system receives a plurality of data samples generated from a media application in a user device for a plurality of media files, where the plurality of data samples may be based on a plurality of contextual features associated with a user's interaction with a least one media file of the plurality of media files. The plurality of contextual features can be collected utilizing at least one sensing module in communication with the user device. Further, one or more of the data samples can be associated with an affinity measure indicative of a user's interaction with at least one of the plurality of media files.

20 Claims, 13 Drawing Sheets

(56) References Cited

U.S. PATENT DOCUMENTS

2018/0004735 A1* 1/2018 Singh .................... G06F 16/435
2018/0124458 A1* 5/2018 Knox ................. H04N 21/4223

* cited by examiner

```
                                                                    1000
┌─────────────────────────────────────────────────────────────────────┐
│ FORM A GRAPH HAVING A PLURALITY OF NODES AND A PLURALITY OF EDGES,  │
│ EACH NODE REPRESENTS A MEDIA FILE AND AN EDGE REPRESENTS A WEIGHTED │
│ SUMMATION OF A SET OF SIMILARITY FACTORS BETWEEN A PAIR OF MEDIA    │
│ FILES CONNECTED BY THE EDGE                                         │
│                                                                1002 │
└─────────────────────────────────────────────────────────────────────┘
                                    │
                                    ▼
┌─────────────────────────────────────────────────────────────────────┐
│ DETERMINE A SET OF OVERLAPPING COMMUNITIES (e.g. 'K' NUMBER OF      │
│ COMMUNITIES i.e. C1, C2...Ck) OF NODES, WHERE EACH COMMUNITY        │
│ INCLUDES A SET OF NODES OF THE PLURALITY OF NODES                   │
│                                                                1004 │
└─────────────────────────────────────────────────────────────────────┘
                                    │
                                    ▼
┌─────────────────────────────────────────────────────────────────────┐
│ DETERMINE A COMMUNITY VECTOR 'Vn' FOR EACH NODE 'n' ('Vn' BEING A   │
│ VECTOR HAVING 'K' ELEMENTS)                                         │
│                                                                1006 │
└─────────────────────────────────────────────────────────────────────┘
                                    │
                                    ▼
┌─────────────────────────────────────────────────────────────────────┐
│ DETERMINE A PREDICTION VECTOR 'Y' ('Y' BEING A K-ELEMENT VECTOR)    │
│ INDICATING PROBABILITY OF AN IDEAL NODE (THAT IS TO BE RECOMMENDED  │
│ TO USER) BEING MEMBER OF EACH OF 'K' COMMUNITIES                    │
│                                                                1008 │
└─────────────────────────────────────────────────────────────────────┘
                                    │
                                    ▼
┌─────────────────────────────────────────────────────────────────────┐
│ COMPUTE A PROBABILITY DISTRIBUTION (PD1) OVER MEDIA FILES BASED ON A│
│ CLOSENESS MEASURE BETWEEN A COMMUNITY VECTOR 'Vn' OF INDIVIDUAL     │
│ NODES AND THE PREDICTION VECTOR 'Y'                                 │
│                                                                1010 │
└─────────────────────────────────────────────────────────────────────┘
```

```
┌─────────────────────────────────────────────────────────────────────┐
│ FORM A GRAPH HAVING A PLURALITY OF NODES AND A PLURALITY OF EDGES,  │
│ EACH NODE REPRESENTS A MEDIA FILE AND AN EDGE REPRESENTS A WEIGHTED │
│ SUMMATION OF A SET OF SIMILARITY FACTORS BETWEEN A PAIR OF MEDIA    │
│ FILES CONNECTED BY THE EDGE                                         │
│                                                                1052 │
└─────────────────────────────────────────────────────────────────────┘
                                    │
                                    ▼
┌─────────────────────────────────────────────────────────────────────┐
│ DETERMINE A SET OF OVERLAPPING COMMUNITIES (e.g. 'K' NUMBER OF      │
│ COMMUNITIES i.e. C1, C2...Ck) OF NODES, WHERE EACH COMMUNITY        │
│ INCLUDES A SET OF NODES OF THE PLURALITY OF NODES                   │
│                                                                1054 │
└─────────────────────────────────────────────────────────────────────┘
                                    │
                                    ▼
┌─────────────────────────────────────────────────────────────────────┐
│ DETERMINE A COMMUNITY VECTOR 'Vn' FOR EACH NODE 'n' ('Vn' BEING A   │
│ VECTOR HAVING 'K' ELEMENTS)                                         │
│                                                                1056 │
└─────────────────────────────────────────────────────────────────────┘
                                    │
                                    ▼
┌─────────────────────────────────────────────────────────────────────┐
│ DETERMINE A PREDICTION VECTOR '$Y_{(i)}$' ('$Y_{(i)}$' BEING A      │
│ K-ELEMENT VECTOR DETERMINED AT TIME STEP 'i') INDICATING            │
│ PROBABILITY OF AN IDEAL MEDIA (THAT IS TO BE RECOMMENDED TO USER)   │
│ BEING MEMBER OF EACH OF 'K' COMMUNITIES                             │
│                                                                1058 │
└─────────────────────────────────────────────────────────────────────┘
                                    │
                                    ▼
┌─────────────────────────────────────────────────────────────────────┐
│ COMPUTE A PROBABILITY DISTRIBUTION (PD2) OVER MEDIA FILES BASED ON  │
│ A CLOSENESS MEASURE BETWEEN A COMMUNITY VECTOR 'Vn' OF INDIVIDUAL   │
│ NODES AND THE PREDICTION VECTOR '$Y_{(i)}$'                         │
│                                                                1060 │
└─────────────────────────────────────────────────────────────────────┘
```

```
┌─────────────────────────────────────────────────────────────────────────┐
│ FORM A DIRECTED GRAPH COMPRISING A PLURALITY OF NODES AND A PLURALITY   │
│ OF DIRECTED EDGES, EACH NODE REPRESENTING AN AUDIO FILE AND A DIRECTED  │
│ EDGE FROM THE PLURALITY OF DIRECTED EDGES ORIGINATING FROM A FIRST NODE │
│ TO A SECOND NODE REPRESENTING A FIRST AUDIO FILE CORRESPONDING TO THE   │
│ FIRST NODE BEING PLAYED BEFORE A SECOND AUDIO FILE CORRESPONDING TO THE │
│ SECOND NODE                                                        1202 │
└─────────────────────────────────────────────────────────────────────────┘
                                    │
                                    ▼
┌─────────────────────────────────────────────────────────────────────────┐
│ ASSIGN A WEIGHT TO EACH DIRECTED EDGE BASED ON TIME LAPSE BETWEEN A     │
│ PLAYBACK OF THE FIRST AUDIO FILE AND A PLAYBACK OF THE SECOND AUDIO FILE│
│                                                                    1204 │
└─────────────────────────────────────────────────────────────────────────┘
                                    │
                                    ▼
┌─────────────────────────────────────────────────────────────────────────┐
│ AT A TIME STEP 'i', DETERMINE A SUCCESSIVE SCORE FOR EACH NODE TO MEASURE│
│ SUCCESSIVENESS TO AN AUDIO FILE LISTENED TO AT A PRECEDING TIME STEP 'i-1'│
│ BASED ON THE DIRECTED GRAPH                                        1206 │
└─────────────────────────────────────────────────────────────────────────┘
                                    │
                                    ▼
┌─────────────────────────────────────────────────────────────────────────┐
│ AT THE TIME STEP 'i', COMPUTE A PATH SCORE FOR EACH NODE BASED ON THE   │
│ SUCCESSIVE SCORE DETERMINED AT THE TIME STEP 'i' AND A PRECEDING PATH   │
│ SCORE COMPUTED AT THE PRECEDING TIME STEP 'i-1'                         │
│                                                                    1208 │
└─────────────────────────────────────────────────────────────────────────┘
                                    │
                                    ▼
┌─────────────────────────────────────────────────────────────────────────┐
│ COMPUTE A PROBABILITY DISTRIBUTION (PD4) OVER AUDIO FILES BASED ON      │
│ CORRESPONDING PATH SCORE ASSOCIATED WITH EACH AUDIO FILE AT THE TIME    │
│ STEP 'i'                                                                │
│                                                                    1210 │
└─────────────────────────────────────────────────────────────────────────┘
```

FIG. 12

METHODS AND SYSTEMS FOR MANAGING MEDIA CONTENT IN A PLAYBACK QUEUE

RELATED APPLICATIONS

This application is a continuation-in-part of U.S. application Ser. No. 15/711,656 filed Sep. 21, 2017, which claims the benefit of priority to U.S. Provisional Application No. 62/397,824 filed Sep. 21, 2016; and further claims the benefit of priority to U.S. Provisional Application No. 63/075,170 filed Sep. 6, 2020; said U.S. Provisional Application No. 62/397,824, U.S. application Ser. No. 15/711,656, and U.S. Provisional Application No. 63/075,170 being hereby incorporated in their respective entireties.

TECHNICAL FIELD

Embodiments disclosed herein are generally related to consuming media content. Particular embodiments herein relate to systems and methods for indexing and recommending media content in a playback queue to be provided to a user or consumer of media content.

BACKGROUND

Consumers today have access to a plethora of digital media content, such as music and videos, at any time or location, through a wide variety of media devices, including smartphones, desktop computers, laptops, dedicated media players, etc.

The media content is played to the user through a sequence of one or more media items. To view and manage this sequence of media items, the service provider may offer the user with a 'queue' service. The queue allows the user to view the upcoming media items to be played next, in addition to the media item being currently played. The queue also allows the user to manage the upcoming media items by adding, removing, or reordering the media items according to the user's unique preferences.

Service providers today offer two general service models for populating a user's queue. One such model is a playlist, defined by a group of individual media items in a specific order, which can be either curated and provided by the service provider or curated by the user. Another such model is a station, which is defined by a given seed or seeds, a seed being a specific artist, album, genre, style, playlist, etc. In the station model, the individual media items populated in the queue are all related to the seed according to some preconfigured relationships determined by the service provider.

Every user has a unique preference to what media items should be played to them and in what ordering. This preference can depend on multiple factors, including the user's unique taste and preferences of media content as well as the user's unique context. The user's context may be defined by the time of day, the day of week, the weather conditions, the user's location, the user's activity, the user's mood, the user's physiological conditions (e.g., heart-rate, body temperature, blood pressure) and other internal and external factors, factors that can be deduced and obtained through the wide variety of media devices used for playback of media content or otherwise.

Each of the playlist and station models offer their own disadvantages when it comes to satisfying the user's unique taste and preferences according to their unique context.

A static grouping of media items such as that of a playlist that satisfies the user's current conditions may not satisfy the user's future conditions, making the playlist useless after its first use or first few uses. Moreover, given the infinite different ways of combining media items in different orderings to create a playlist, the user is inundated with many different choices of playlists to satisfy their current condition and preferences, whether those playlists are curated by the service provider or the user themself. Such a model further burdens the user with having to curate a customized playlist for each moment as they see fit.

Seed-based stations, though not static in nature in terms of the combination and ordering of media items, also present their own set of disadvantages. By definition, these stations populate the user's queue according to a given seed or seeds. As a result, all the media items populated in the user's queue will somehow be related to the given seed or seeds according to some predefined factors determined by the service provider, making the combination of media items generic and unsatisfying to the average user with their own unique preferences of combining variant styles and genres according to their current context.

Furthermore, both the playlist and seed-based station models force the user to choose what playlist or seed media item with which the user wishes to commence their media content consumption. The user is often inundated with a plethora of playlists or a plethora of seeds with which to initiate a station, resulting in a poor user experience if the user is not sure as to what they want played.

SUMMARY

As such, there is a need for systems and methods for indexing, recommending, and populating a playback queue of media items to be played to a user according to their unique preferences, current context, past consumption patterns, and past interactions, among other factors. The user's context is defined herein as a combination of the user's internal and external factors at a given point in time. Some non-exhaustive examples of these factors include the time of day, the day of week, the weather conditions, the user's location, the user's activity, the user's mood, the user's physiological conditions (e.g., heart-rate, body temperature, blood pressure), etc. Such systems and methods would also allow users to easily view, manage, and utilize their playback queue. Such systems and methods may optionally complement or replace conventional methods for managing and recommending the playback of media items.

Various embodiments of the present disclosure provide systems and methods for a media playback queue.

In one embodiment of the present invention, a media playback queue is defined consisting of a media item being currently played, a queue of upcoming media items to be played, and suggestions of one or more media items or one or more groups of media items to be added or inserted into the queue.

In one embodiment, systems and methods are defined to determine the media item to be played, the combination and ordering of upcoming queued playback media items, and suggestions of media items or groups of media items to be inserted into the queue by the user, according to the user's current context (as defined above).

In one embodiment, systems and methods are defined to determine the media item to be played, the combination and ordering of upcoming queued playback media items, and suggestions of media items or groups of media items to be inserted into the queue by the user, according to the user's unique preferences of media content according to a plurality of different classifications.

In one embodiment of the present invention, systems and methods are illustrated to determine the media item to be played, the combination and ordering of upcoming queued playback media items, and suggestions of media items or groups of media items to be inserted into the queue by the user, according to the user's past consumption patterns of media content.

In one embodiment, systems and methods are defined to determine the media item to be played, the combination and ordering of upcoming queued playback media items, and suggestions of media items or groups of media items to be inserted into the queue by the user, according to the user's past and present interactions with the media playback queue, such as media items added, removed, or inserted into the queue by the user.

In one embodiment, systems and methods are defined to determine the media item to be played, the combination and ordering of upcoming queued playback media items, and suggestions of media items or groups of media items to be inserted into the queue by the user, according to the current state of the media playback queue (e.g., the current existing media item being played, the combination and ordering of the existing queued media items, and the existing suggestions for media items and groups of media items).

In accordance with an embodiment, described herein is a system and method for pro-viding media content to a media playback device that includes a media server operating on one or more processors and a memory storing computer program code for recommending the media items or groups of media items to be added or inserted into the playback queue.

In accordance with some implementations, a client device includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the client device, cause the client device to perform the operations of the method described above.

Thus, devices are provided with efficient, user-friendly systems and methods for indexing and recommending playback of media content in a playback queue.

BRIEF DESCRIPTION OF DRAWINGS

By way of example embodiments, reference is made to the following descriptions in connection with the accompanying drawings in which:

FIG. 10A is a flow diagram of a method for computing a probability distribution over a plurality of media files, in accordance with an example embodiment.

FIG. 10B is another flow diagram of a method for computing a probability distribution over a plurality of media files, in accordance with an example embodiment.

FIG. 12 is another flow diagram of a method for computing a probability distribution over a plurality of media files, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to a same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
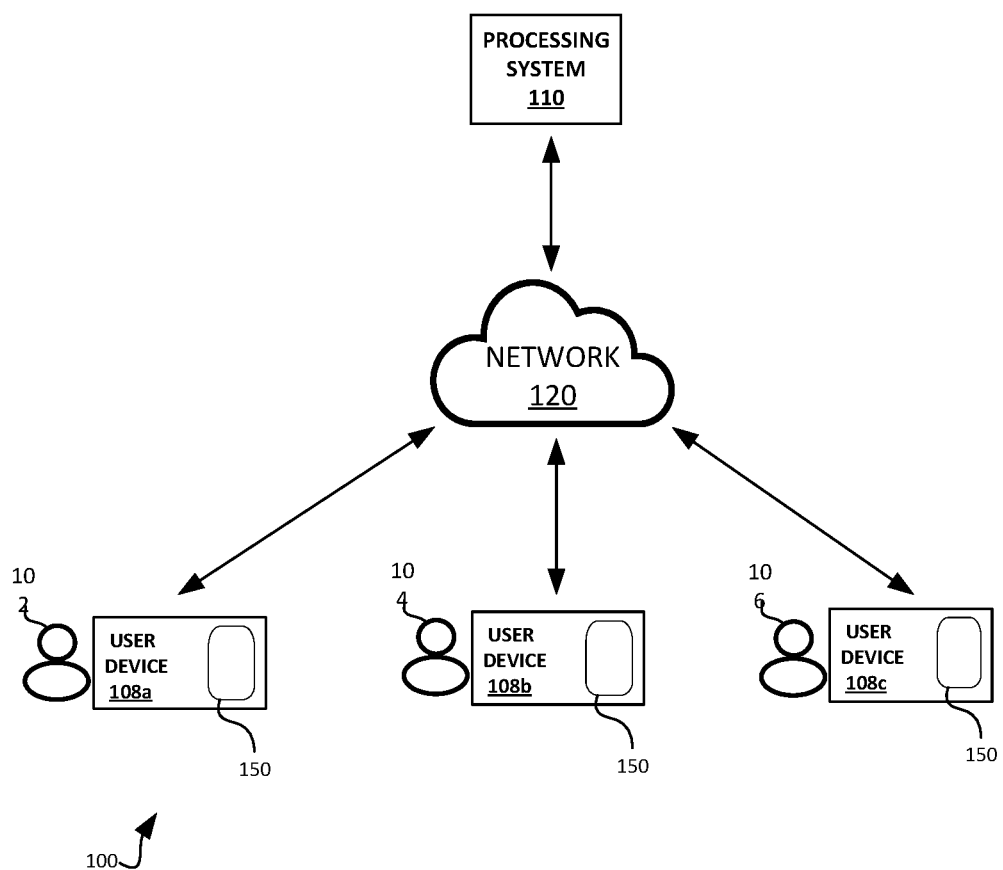
FIG. 1 illustrates an example environment related to at least some embodiments.

FIG. 1 illustrates an example environment 100 related to at least some embodiments of the present invention. An example network environment 100 of FIG. 1 can be implemented as a network computer system, including one or more servers that communicate with user devices (e.g., mobile devices, tablets, network-enabled media devices, etc.) over one or more networks. As such, it should be noted that at least some of the components described below in connection with the environment 100 may be optional, and still further, embodiments may include more, less or different components than those described in connection with the example embodiment of FIG. 1 and/or with subsequent FIGS. 2 to 12.

In the illustrated example representation, the environment 100 depicts a plurality of users such as users 102, 104 and 106 with their respective user devices such as 108a, 108b and 108c respectively. In various embodiments, the user devices 108a-c may be a mobile phone, a computer, a tablet, a virtual reality headset, electronic glasses, or any other multimedia device having UI such as display. The environment 100 is further shown depicting a communication network such as a network 120 that connects the user devices 108a-c to at least one processing system such as the processing system 110. In an example embodiment, the processing system 110 may be a single composite server, or it may have multiple subsystems or servers. The network 120 may be a centralized network or may include a plurality of sub-networks that may offer a direct or indirect communication between the processing system 110 and the user devices 108a-c. For example, the network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet.

The processing system 110 may correspond to a Web-based platform (for example, a cloud plat-form) capable of being accessed over the network 120. The Web-based platform may provision a Music Playback Queue application 150 or a music application containing a Music Playback Queue (hereinafter used interchangeably and referred to as MPQ application 150 or simply application 150) as a Web service accessible through a Website. In such a scenario, a plurality of users (such as the users 102, 104 and 106) may access the Website over the network 120 using Web browser applications installed in their respective computing devices and thereafter use the services of the MPQ application 150.

In at least one example embodiment, the processing system 110 may also be configured to store an MPQ application program and provision instances of the MPQ application 150 to end-users (such as the users 102, 104 and 106) for facilitating playback queue indexing and recommendation based on their respective and real time contextual information. The users/end-users may request the processing system 110 to access to the MPQ application 150 over the network 120 using their respective computing devices. The instances of the MPQ application 150 may thereafter be downloaded on respective user devices of the end-users in response to their request for accessing the MPQ application 150. Alternatively, in some embodiments, the MPQ application 150 may be factory installed within the computing devices (such as the computing devices 108a-c) associated with the end-users and, as such, the users may not need to explicitly request the MPQ application 150 from the processing system 110 as exemplarily shown in FIG. 1.

In an embodiment, based on the requirements of the underlying device platform or operating system being used by the users, the user devices 108A, 108B, 108C, either individually or collectively operate multiple MPQ applications 150, with each MPQ application 150 using a different technology. For example, the MPQ application 150 of one or more of the user devices 108A, 108B, 108C may be implemented using a markup language such as HTML and related technologies displayed inside a web-browser technology such as Safari, Firefox, or Internet Explorer. In yet another embodiment, the MPQ application 150 operated on one or more of the user devices 108A, 108B, 108C may be a stand-alone application designed to be downloaded and run on a specific device such as a tablet running the Apple iOS operating system, Android operating system, or others. The stand-alone applications may be created using a set of application programming interfaces (APIs) and libraries.

In one embodiment, a user (e.g., the user 102/the user 104/the user 106) upon accessing the Website and/or the MPQ application 150 associated with the processing system 110 may optionally be presented with one or more UIs displayed (not shown) on a display screen of the user device to send a profile creation request to the processing system 110 so as to utilize various features of the application upon registration/creation of the profile. The user may be prompted to provide personal information using the UI, such as his or her name, age (e.g., birth date), gender, interests, contact information, location, occupation, favorite activities, relationship status and the like. This information is stored, for example, as a form of data samples in a database associated with the processing system 110 with a reference number to identify the user. In one example embodiment, these data samples related to the user's personal information may be used by the processing system 110 for playback queue indexing and recommendation to the user. A registered user is hereinafter alternatively referred to as a user having his/her profile created in the processing system 110.

In at least one example embodiment, the MPQ application 150 installed on the device of the user may be configured to utilize a plurality of sensing modules associated with the respective user devices 108A, 108B, 108C. The sensing modules can operate to collect device information about (i) the user, (ii) the user's interactions with the MPQ application 150, and/or (iii) the user's activities. By way of example, the device information can include information obtained from sensory modules of a user device that include: an accelerometer, a gyroscope, a magnetometer, a camera, a microphone, a GPS (Global Positioning System) receiver, a light sensor, an altitude sensor, a proximity sensor, a compass, a blood pressure monitor, a heart rate monitor, a body temperature sensor, a papillary response detector, a hemoglobin saturation monitor, a skin conductivity monitor, a respiration rate monitor, a brainwave activity inspector and the like. Still further, the sensory modules of the user devices 108A, 108B, 108C can include logic that determines sensory information from raw sensory input (e.g., acceleration from accelerometer input; microphone for heart rate monitor, etc.).

In some cases, the processing system 110 may be embodied within each of the user devices 108a-c for making the playback queue indexing and recommendation locally, and in such cases, there is no need of receiving indexing and recommendation information over the network 120. Alternatively, the processing system 110 can be distributed between server and user device 108a-c, such that functionality as described for indexing and generating recommendations can be implemented using local and network resources of the processing system 110.

Interface

Figure 2:
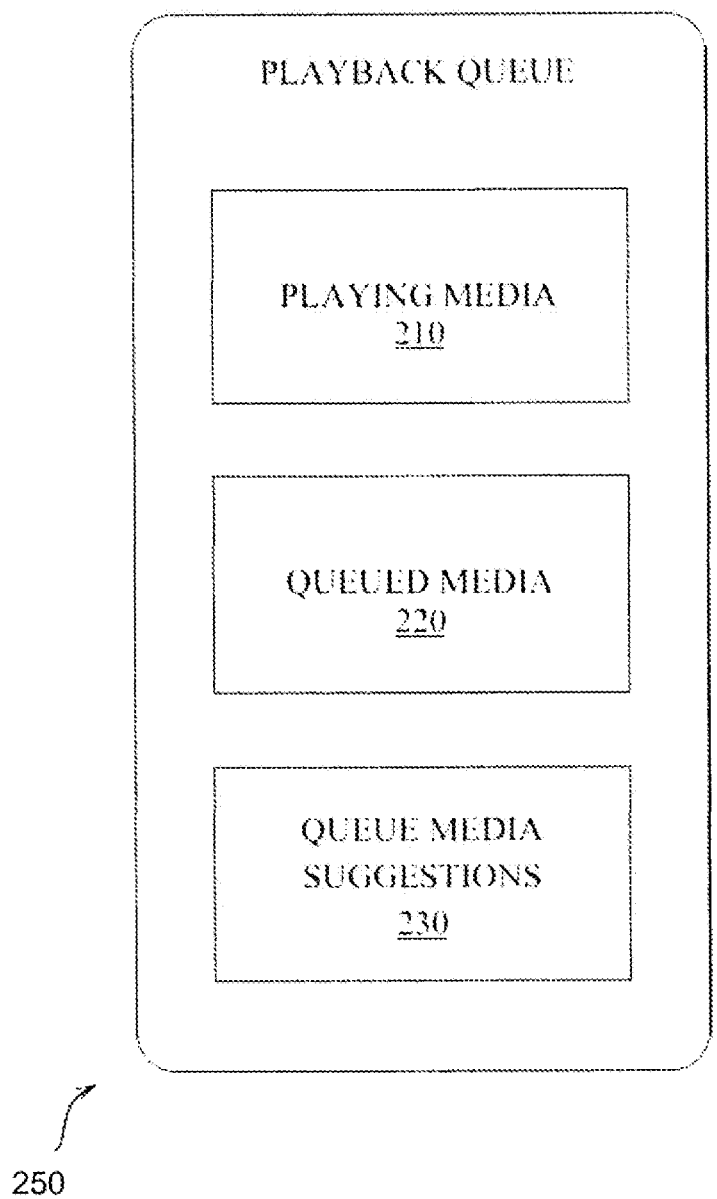
FIG. 2 illustrates a user interface related to at least some embodiments.

FIG. 2 shows a Simplified User Interface for implementing one or more examples as described, according to one or more embodiments. According to examples, an SUI 250 can be implemented on each user device 108a-c to cause the user device to display metadata and/or content of a media item currently being played ("now playing queue component 210"), as well as metadata and/or content of the upcoming media items queued to be played next ("play next queue component 220"), and metadata and/or content about one or more media items or groups of media items suggested to be included in the playback queue ("suggested queue component 230"). The queue components 210, 220, 230 can be arranged, displayed or otherwise configured in ways other than that shown by an example of FIG. 2, without limiting the scope of the present disclosure. As referred to herein, media files include, but are not necessarily limited to, picture, music, audio, and video files or items that are digitally stored, transmitted and consumed or used in accordance with various digital encoding formats.

Figure 3:
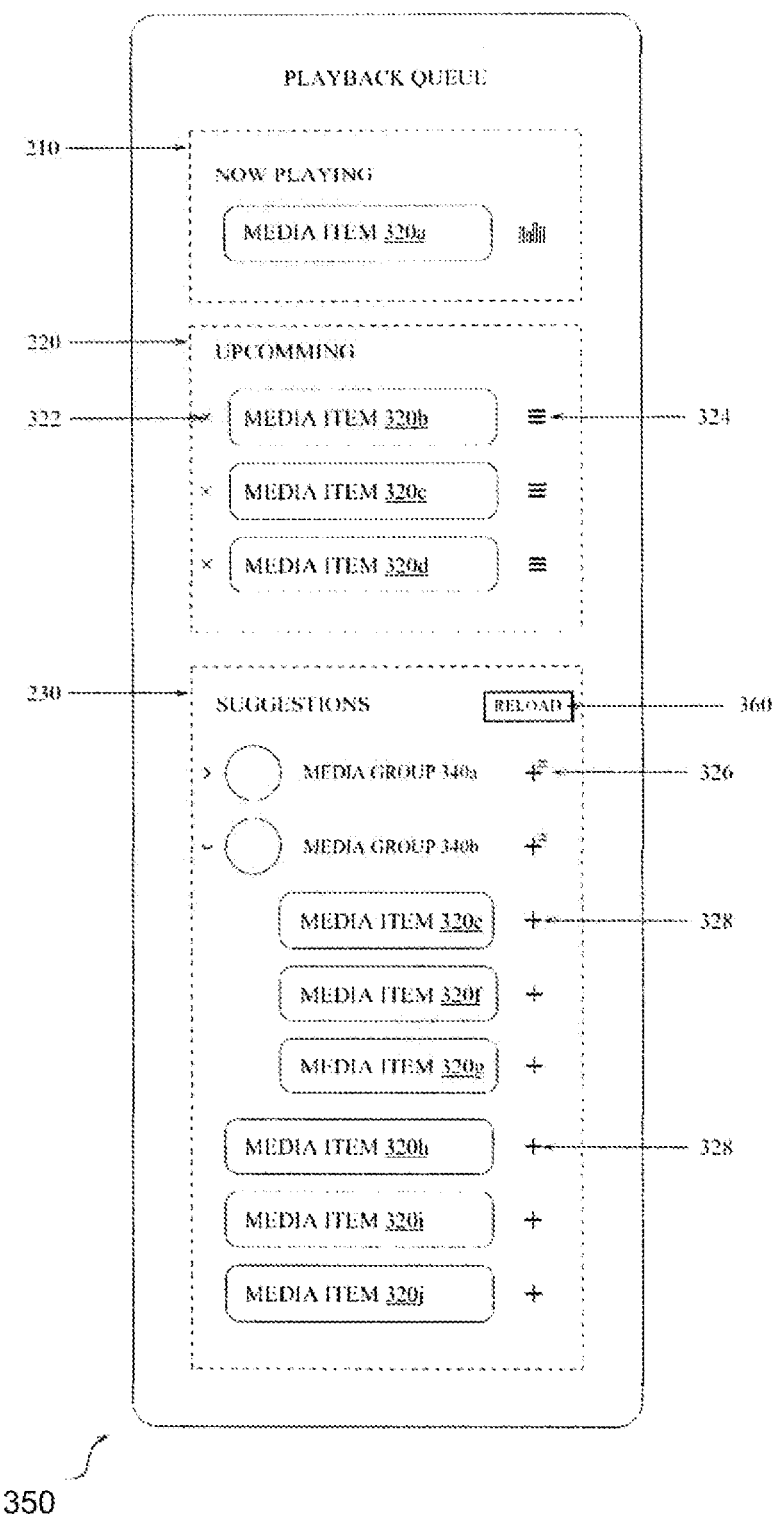
FIG. 3 illustrates a detailed user interface related to at least some embodiments.

FIG. 3 shows a Detailed User Interface for implementing one or more examples as described, according to one or more embodiments. According to examples, a Detailed User Interface ("DIU 350") can be implemented on each user device 108a-c to cause the user device to display subcomponents of the queue components 210, 220, 230.

Referring to FIG. 3, the now playing queue component 210 represents the portion of DUI 350 that displays the current media item being played. The DUI 350 can display metadata items 320A (e.g., title) that identify the media item being played. The media item being played may be chosen by the processing system 110, by the MPQ application 150, or by the user. The selection of the media item represented by the metadata identifier 320A can be responsive to an event, such as an event detected through the MPQ application 150.

With further reference to an example of FIG. 3, the play next queue component 220 represents the portion of DUI 350 that displays the upcoming media item or media items, represented by metadata identifiers 320b, 320c, and 320d. The DUI 350 can also identify the sequence or order in which the media items identified by the metadata identifiers 320b, 320c, and 320d will be played, after the current media item finishes playing. The metadata identifiers 320b, 320c, and 320d displayed in play next queue component 220 can be determined by the processing system 110 and/or the MPQ 150, or alternatively, manually added or inserted by user input. Further, in examples, user input to add identify media items of metadata identifiers 320b, 320c, and 320d, can be responsive to suggestions generated by the processing system 150 and/or MPQ 150, including suggestions displayed through the suggested queue component 230.

In examples, the user can specify input to perform any one of multiple possible actions on a given media item identified in play next queue component 220: a) remove the media item from the queue, such as by tapping an icon 322, where all the other media items identified in queue component 220 will be shifted in order to fill the void or gap in the queue caused by the removal; b) move a media item in the play next queue component 220 to a different index within the queue of upcoming tracks, using an icon 324 and/or performing an action such as dragging the item to the desired index, resulting in other media items in the queue component 220 to be shifted accordingly to accommodate the change in indexing; and c) select the identified media item in the play next queue component 220, in which case, the current playback media item can change to the selected media item, such that all the media items with an index that comes before that of the selected media item are removed by the system automatically.

In FIG. 3, the suggested queue component 230 represents the portion of DUI 350 that displays metadata identifiers 320c, 320f, 320 of media items (or groups of media items) that are being suggested to be added or inserted into the queue of upcoming media items. Media items suggested individually, such as that of 320e-i may be added to the queue by tapping on an icon such as 328. Suggested media items can alternatively be grouped into media item groups such as 340a and 340b and have all its media items added to the queue by the user tapping on an icon such as 326. The user may toggle between two different states of display of a media items group, namely collapsed, where all the contained media items are hidden from the display, and expanded, where all the media items are shown in the display. Referring to FIG. 3, group 340a represents a collapsed media items group, whereas group 340b represents an expanded media items group, where it is shown containing media items 320e-g.

The media items contained in a media items group need not be all of the same style, genre, type, tempo, etc. The combination and ordering of media items in a group may be determined in real-time as the user interacts with the playback queue. The name associated with a media items group also need not be related to the types and styles of media items grouped. As an example, the name of a media items group can be associated with an activity that the MPQ 150 predicts best suits or is otherwise indicative of the context of the user (e.g., music for your jog, your road trip music, etc.).

In reference still to FIG. 3, the user may choose to reload the suggestions of suggested queue component 230 by using, for example, a feature 360 (e.g., soft button or icon). In that case, some examples provide for (i) the current suggestions to be removed from the suggested queue component 230 and replaced with new suggestions, or (ii) the new suggestions are simply added to the list of current suggestions.

Methodology

Figure 4:
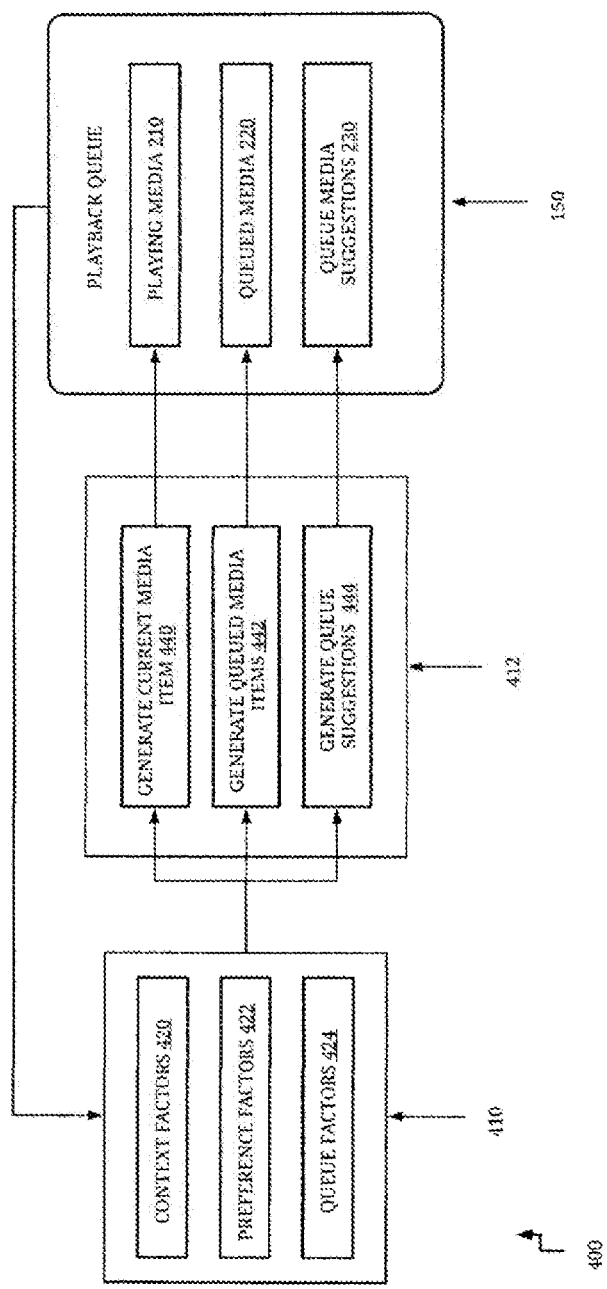
FIG. 4 illustrates a flow diagram of a method for facilitating the indexing and recommendations of the playback queue, in accordance with an example embodiment.

FIG. 4 illustrates an example method 400 for generating the media items or groups of media items that are suggested and utilized for a playback queue of a media application 150, according to one or more embodiments. The various steps and/or operations of the flow diagram, and combinations of steps/operations in the flow diagram, may be implemented by, for example, hardware, firmware, a processor, circuitry and/or by the processing system 110 of FIG. 1 and by a combination of a user device associated with a user and the processing system 110. The steps and/or operations of an example method 400 are not necessarily performed in a sequence, and they may be performed simultaneously or in a different sequence than as shown in FIG. 4. Further, some steps and/operations may have a plurality of sub-steps, or even some of the steps/operations may be performed together in a joint manner.

Figure 5:
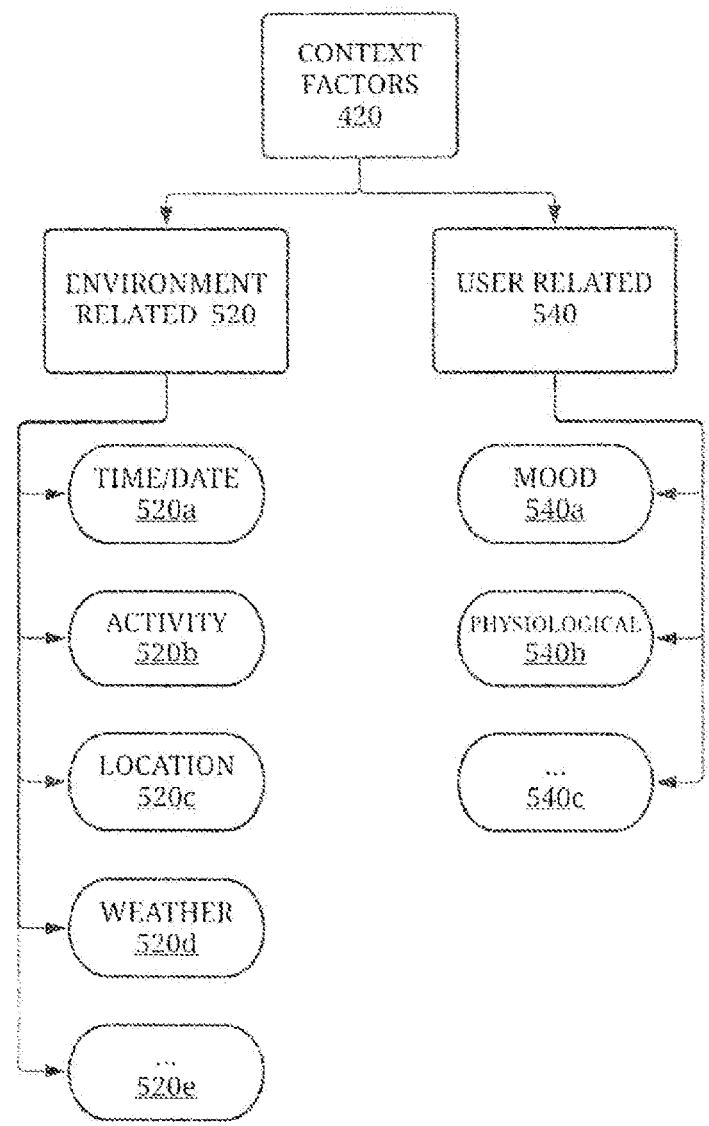
FIG. 5 illustrates the different features that define the context factors, in accordance with an example embodiment of the present disclosure.
Figure 6:
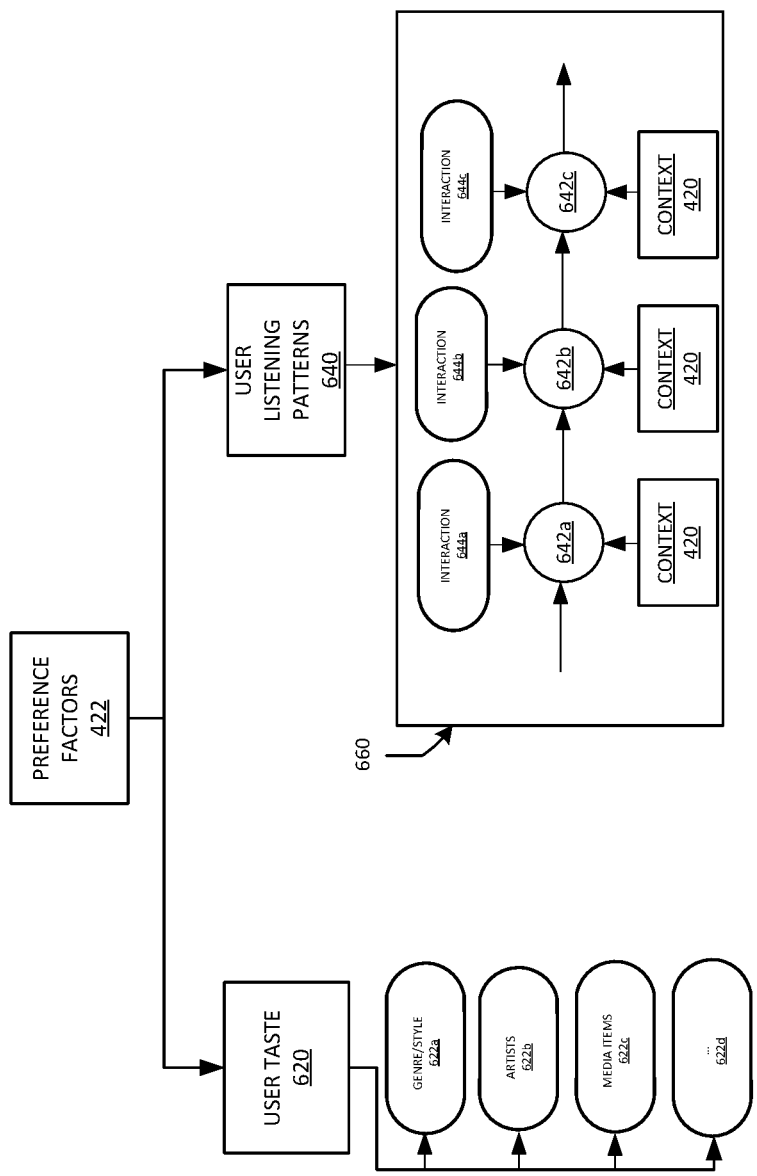
FIG. 6 illustrates the different features that define the preference factors, in accordance with an example embodiment.
Figure 7:
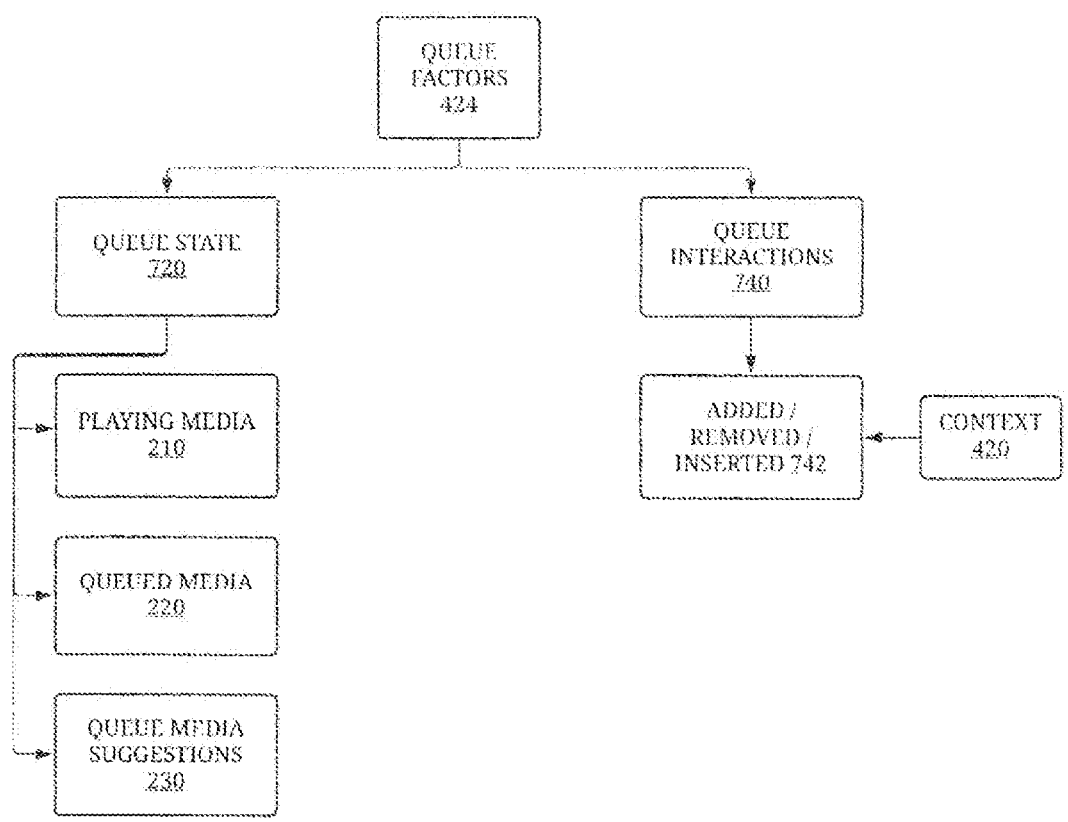
FIG. 7 illustrates the different features that define the queue factors, in accordance with an example embodiment.

At 410, the method 400 collects the relevant data from MPQ application 150 or elsewhere from the processing system 110 in the forms of context factors 420, preference factors 422, and queue factors 424. FIG. 5, FIG. 6, and FIG. 7 describe the nature of these factors in more detail. These factors are not mutually exclusive, and one set of factors may be used to derive another set.

At 412, the method 400 utilizes the data collected at 410 to generate the media items or groups of media items that are suggested and utilized for the MPQ application 150, in accordance with one or more embodiments.

At 440, the data collected at 410 is used to determine a media item to be currently played by the MPQ application 150. The media item can be identified by the now playing queue component 210. In variations, the user may also manually select the currently played media item without any input from method 400.

At 442, the data collected at 410 is used to determine a combination of media items in a specific order that are in turn used to determine the upcoming media items or a subset of the media items that are to be queued by the MPQ application 150 at the play next queue component 220.

At 444, the data collected at 410 is used to determine the media items or groups of media items to be suggested by the MPQ application 150 at the suggested queue component 230, for addition to the playback queue by the user.

In some embodiments, the method includes receiving, by a processing system, a plurality of data samples generated from a media application in a user device for a plurality of media files that include a media file being played and an ordered queue of upcoming playback media files following the media file being played. The plurality of data samples can be based at least in part on a plurality of contextual features associated with a user of the user device in association with a user's interaction with at least one media file of the plurality of media files. In some embodiments, the plurality of contextual features may be sensed or collected utilizing or more sensing modules communicatively coupled to a processor of the user device. The processing system may compute one or more probability distributions based at least in part on the data samples, where at least one of the data samples is associated with an affinity measure m indicative of a user's interaction with at least one of the plurality of media files, m being in the range $[-\gamma, \gamma]$, whereby $\gamma$ is an arbitrary numerical or scalar value assigned by the processing system, a greater value of m indicating a greater affinity of the user for a particular media file. The processor may determine a ranking of the plurality of media files based on the probability distributions over the plurality of media files in association with the plurality of data samples. The processing system may recommend one or more media files from the ranking of the plurality of media files to the user at a User Interface (UI) of the user device, enabling playing back the one or more media files at the UI.

In embodiments, a data sample includes a data package produced by the user's device that captures and summarizes the interaction the user has taken with one or more media items, as well as the contextual factors prevailing or associated with the user interaction taken. In one embodiment, a type of data sample may relate to the outcome of a song "played" to the user on a smart radio station. In this type of data sample, the outcome is measured by the affinity measure m, where the outcome is related to whether the user listened to the song in full or skipped the song before it was complete. Furthermore, a data sample may also define other user interactions which may not necessarily be associated with an affinity measure, such as adding a song to the queue, or switching the positions of two songs in the queue.

In embodiments, the affinity measure is associated with, and indicative of, a particular user's preference or likely predilection for consuming a given media content or a media file. In an illustrative case of an audio file or audio content, the user's affinity for a given song or audio file can be in accordance with a number of times the user has fully listened to a given song or song genre, as opposed to enacting a swiping action received at a UI display that preempts playing of the song, or that terminates playing after partial playing of the song. The affinity measure further applies to predictions as to the degree that the given user would be desirous of consuming or listening to a recommended song or similar media file. A given user's affinity for the different types, styles, genres, among other categorizations, of media items, as well as individual media items may be computed as an affinity score associated with a particular media item or a particular classification of media items, with the affinity score determined in accordance with either a binary or a continuous scoring method, or some combination thereof, in some embodiments.

In some embodiments, the user's interaction with the media files may comprise replacing one or more media files in the ordered queue of upcoming playback media files, or modifying an order of media files in the ordered queue of upcoming playback media files. In some aspects, the data samples generated can include a data sample for user's interaction with the queue of upcoming playback media items based on a state of the media application before the user's interaction, a state of the media application after the user's interaction, and the contextual factors prevailing at a time of the user's interaction. The contextual factors may relate to one or more of a time of day, a day of week, a weather condition, the user's location, the user's activity, the user's mood, and the user's physiological condition in accordance with at least one of a heart-rate measurement, a body temperature measurement, a blood pressure measurement, and a pulse measurement, where the state of the media application relates to the media file being played, media files in the ordered queue of upcoming playback media files, and a current set of media file item recommendations offered by the media application.

In some aspects, the user interaction of selecting a media item in the ordered queue of upcoming playback media files replaces the media file being played with the selected media item, and may also replace media files of the ordered queue of upcoming playback media files with media files that followed the selected media item. In embodiments, upon the user interaction, the media application updates current recommendations of media items offered by the application. In some aspects, the data samples includes information feedback of the user's interaction with the media files, which in some embodiments can be based upon a like or a dislike enacted in relation with particular ones of the media files. In related aspects, the affinity measure m associated with a particular media file may be based upon a binary or continuous scoring method in accordance with the user's interaction with the ones of the plurality of media files.

In some embodiments, similarity factors between media items can be based upon intrinsic factors and extrinsic factors. In an illustrative example of an audio file, intrinsic factors can be such as a song's genre, era, style, language, and artiste. Intrinsic factors can also be factors derived from an analysis of the song's audio data, such as BPM (beats per minute), and tempo. Intrinsic factors can broadly represent attributes unique to the given media item or file and cannot be changed by external factors over time. Extrinsic factors, on the other hand, can be such as how often a song appears in an external classification (for example, the Billboard Top 100 Pop Chart) in, say, the past two years. An extrinsic value can be defined such that, for a given pair of songs, the value is greater if the two given songs tend to be played within a shorter time of each other (by a given user, or even aggregated across all users). Extrinsic factors can broadly be considered as factors that are ephemeral and change over time, such as when the Billboard charts are updated or if the user's listening patterns change.

FIG. 5 illustrates various different features that define the context factors 420. These factors can be divided into two subgroups: A) environment-related factors 520 are those that define the external conditions of the user, such as time/date 520a, user's activity 520b, user's location 520c, weather 520d, among other factors; B) user-related factors 540 are those that define the internal conditions inherent to the user, such as the user's mood 540a, the user's physiology 540b, etc. These factors can be defined for a specific point in time, such as the user's current state or a past state at which a media item was consumed. In embodiments, defining the user's mood can be in accordance with requiring the user to select a category of mood the user is feeling at a given time to recommend songs, or other media files, to the user, and being based on manual inputs from the user. Embodiments herein further may infer a mood of the user based upon media files consumed by the user, and similarity of same to other media files that can be recommended to the user or presented in a playback queue, whereby the user is no longer required to choose a mood category whenever he/she desires to listen to the music rather the system is configured to automatically infer in accordance with the contextual features.

FIG. 6 illustrates the different components that define the preference factors 422, namely the user's unique taste of media content 620 and the user's past consumption patterns of media content 640.

The user taste 620 represents the user's affinity for the different types, styles, genres, among other categorizations, of media items, as well as individual media items. The affinity may be measured using a binary measure such as like/dislike via a user swipe enacted at a UI of a mobile device) or continuous measure (measure of likeness) in one embodiment.

The user's past listening patterns 640 represent the patterns and context in which the user has consumed media content. One such pattern 660 involves the sequence of all the media items the user has consumed, including the ordering in which they were consumed. For each media item consumed, the context 420 in which the media item was consumed is recorded and associated with the media item. Moreover, for each media item consumed, the form of consumption is also recorded and associated with, such as whether the media item was skipped by the user, after what duration into the media item was it skipped by the user, item was played in full, etc. The conglomerate of these data patterns is then used by method 400, among other signals, to determine the optimal suggestions and recommendations to be presented in the media application 150. In embodiments, user taste 620 may relate to genre or style 622a, artistes 622b and content media 622c. Particular user interactions 644a, 644b, 644c performed at a given point in time may be associated with data samples 642a, 642b, 642c respectively in relation to particular context 420 factors prevailing at the time of the particular user interactions.

FIG. 7 illustrates the different components that define the queue factors 424, namely the current queue state 720 and the past and present queue interactions 740.

At 720, the current state of the playback queue includes the existing current media item that is playing 210, the existing upcoming queued media items 220, as well as the existing suggested media items 230 in the MPQ application 150.

At 740, the queue interactions include all the interactions the user has had with the playback queue, including, but not limited to, adding, removing, or inserting media items or groups of media items into the playback queue, or reloading suggestions for media items or groups of media items to be added to the queue. For each interaction, the context under which the user made the interaction is recorded and associated with the interaction. In some examples, the context can be determined from sensor data recorded on the user device 108a-c. For example, the context can reflect the user's activity (e.g., movement, or type of movement, as recorded by the accelerometer and/or gyroscope), the environmental conditions (e.g., amount of light, such as recorded by the camera or light sensor), or the background noise conditions such as reflected by the audio recordings. As illustrative examples, the sensor data can be collected and compared to labeled sensor profiles, where each labeled sensor profile is associated with a particular user context.

Figure 8:
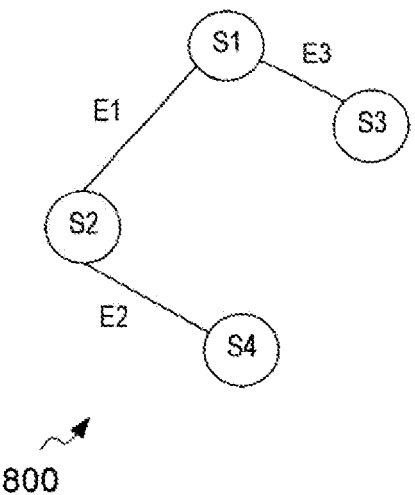
FIG. 8 shows a simplified representation of a network (undirected graph) formed using a plurality of nodes and a plurality of edges, in accordance with an example embodiment of the present disclosure.

Referring now to FIG. 8, an illustrative representation of a network (undirected graph) 800 formed using a plurality of nodes and a plurality of edges, is shown, in accordance with one or more embodiments. It is understood that the graph 800 is a simplified illustrative representation showing a limited number of nodes and edges, and that there may be a large number of nodes and edges depending on a total number of media files, or in the particular embodiment of audio files, songs present in library of the songs associated with the user. Each node represents a media file, in one embodiment of a media file an audio file of a song and an edge represents a similarity between a pair of audio files connected by the edge. In the illustrated simplified representation, the undirected graph 800 is formed (hereinafter alternatively referred to as graph 800/network 800) by the processing system 110 using a plurality of nodes such as the nodes S1, S2, S3 and S4 and a plurality of edges, each connecting a pair of nodes. For example, an edge E1 connects nodes S1 and E2, an edge E2 connects nodes S2 and S4 and an edge E3 connects nodes S1 and S3.

In at least one embodiment, the processing system 110 is configured to assign a weight attribute to each edge of the plurality of edges (e.g., E1, E2, E3 and E4). The value of the weight attribute, in turn, is a weighted summation of a set of similarity factors between the two nodes (for example, two songs in an audio media illustrative embodiment) being connected via the associated edge. For example, for two nodes n1 and n1 (e.g., nodes S1 and S2) with an edge e (e.g., the edge 'E1') connecting the two nodes, the weight $W_e$ of the edge e is calculated using the following equation:

$$W_e = \sum_{i=1}^{N} w_i f_i(n_1, n_2) \quad (1)$$

In the above equation (1), N corresponds to N different similarity factors to be considered to calculate the similarity between any two nodes n1 and n2. Functions $f_i$ represents the similarity factors. Each similarity factor is also associated with a similarity factor weight $w_i$. It is noted that, in the illustrative embodiment of an audio file, each of the $f_i$ functions measures a different form of similarity between the two songs n1 and n2.

In an audio file illustrative embodiment of media files, the similarity factors between a pair of audio files (e.g., nodes n1 and n2) connected by the edge (e.g., e) are determined based on one or more 'audio features' and/or one or more 'non-audio features'. Some non-exhaustive examples of the one or more audio features include a tempo, a rhythm, a loudness, a pitch and the like associated with the connected audio files. The 'non-audio features' are determined based on factors other than the audio files' audio features. For instance, some non-exhaustive examples of the 'non-audio features' include one or more user preferences (like/dislike of a song) provided by the user for the audio files for a predetermined time interval, whether the audio files are included in the same playlist (these playlists may or may not have been defined by the user) and the like.

In one embodiment, the processing system 110 is configured to associate each similarity factor with its own weight $w_i$. The weight associated with each similarity factor can either be a predetermined fixed value, or the values learned through training the user's existing data samples. In some embodiments, the fixed values are used and are arbitrarily determined by the processing system 110. In other embodiments, the learned values are computed by the processing system 110 as they provide improved accuracy and personalization compared to the fixed values. The learned values are obtained by performing an optimization on the weights that leads to better defined/computed communities for computing the respective probability distribution over the media files.

Figure 9:
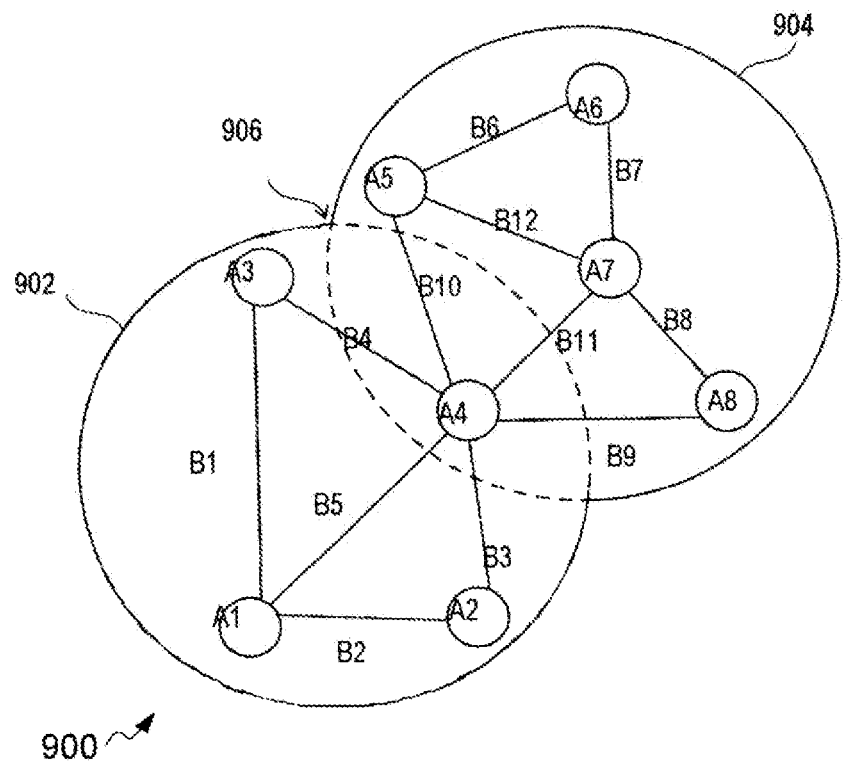
FIG. 9 shows a simplified representation of a set of overlapping communities determined for a network of plurality of nodes and edges, in accordance with an example embodiment.

FIG. 9 shows a simplified representation 900 of a set of overlapping communities determined for a network of plurality of nodes and edges (such as the network 300 of FIG. 3), in accordance with an example embodiment of the present disclosure. The representation 900 is depicted to include an undirected graph including a plurality of nodes, such as the nodes A1, A2, A3, A4, A5, A6, A7 and A8, where each node represents a corresponding song. The graph also includes a plurality of edges, where each edge connects a pair of nodes. For example, Nodes A1 and A3 are connected by edge B1, nodes A1 and A2 are connected by edge B2, nodes A2 and A4 are connected by edge B3, nodes A3 and A4 are connected by edge B4, nodes A1 and A4 are connected by edge B5, nodes A5 and A6 are connected by edge B6, nodes A6 and A7 are connected by edge B7, nodes A7 and A8 are connected by edge B8, nodes A8 and A4 are connected by edge B9, nodes A4 and A5 are connected by edge B10, nodes A7 and A4 are connected by edge B11, and nodes A5 and A7 are connected by edge B12. As explained with reference to FIG. 2, the weight of each edge can be determined by the processing system 110 using equation (1) based on considering various similarity factors.

In at least one embodiment, the processing system 110 is configured to perform a community-detection algorithm on the network of the representation 900 to determine a set of overlapping communities. The processing system 110 can use any of the suitable community detection algorithm for determining the set of overlapping communities within the user's library of songs. Without limiting to the scope of present disclosure, in an embodiment, the processing system 110 uses a community overlap propagation algorithm (COPRA) for determining the overlapping communities. The community-detection algorithm, when executed, determines the set of overlapping communities within the network, where each community consists of a set of nodes and every node in the network is within at least one community. As shown, a community 902 includes a set of nodes A1, A2, A3 and A4 connected by their corresponding edges and a community 904 includes a set of nodes A4, A5, A6, A7 and A8 connected by their corresponding edges. Further, communities 902 and 904 overlap (see, 906) with the node A4 belonging to both the communities 902, 904.

The overlapping communities 902 and 904 are used to define a community vector for each song. In an example scenario, it is assumed that there are total K communities ($C_1, C_2, \ldots, C_K$). For the overlapping communities, every node belongs to at least one community. In an example implementation, for every node n, the processing system 110 determines a binary K-element vector $V_n$, where the ith element in $V_n$ is a nonzero element (e.g., equal to 1) if the node n belongs to community $C_i$. It is understood that $V_n$ is a binary community vector, where n belongs to a song (such as any of the nodes A1-A8) in the network and the elements of the vector $V_n$ are all the communities (such as the communities 902 and 904) detected by the community detection algorithm. Therefore, if a node n (song or media file) belongs to a particular community of the network, the corresponding element of the vector $V_n$ will be 1, and if not, it will be 0. For example, considering only two communities 902 (e.g., $C_1$) and 904 (e.g., $C_2$), a community vector for the node A4 will be A4=[1, 1] and a community vector for the node A7 will be A7=[0, 1].

Further, $V_n$ can also be a scalar community vector, wherein the ith element in $V_n$ has a scalar value in the range [0,1] and indicates a magnitude as to how much node n is associated with community $C_i$. A greater magnitude indicates that the node n has a greater affiliation with the community $C_i$. A value of 0 indicates that the node n has no affiliation with the community $C_i$. Affiliation can be viewed as a metric that represents the degree to which an individual shares a characteristic and/or environment with a community, where the characteristic or environment is selected as an indicator that reflects a propensity of the individual to share a preference or interest with the community. By way of example, a biological offspring of a community member can be viewed has having a greater affiliation to the community as compared to a long term visitor to the community.

FIG. 10A is a flow diagram of an embodiment method 1000 for computing a probability distribution over a plurality of media files, in accordance with an example embodiment of the present disclosure. The various steps and/or operations of the flow diagram, and combinations of steps/operations in the flow diagram, may be implemented by, for example, hardware, firmware, a processor, circuitry and/or by a system such as the processing system 110 of FIG. 1 and by a combination of a user device associated with a user. The steps and/or operations of the method 1000 are not necessarily performed in a sequence, and they may be performed simultaneously or in a sequence different than that of shown in FIG. 10A. Further, some steps and/operations may have a plurality of sub-steps, or even some of the steps/operations may be performed together in a joint manner.

At 1002, the method 1000 includes forming a graph using a plurality of nodes and a plurality of edges. Each node represents a media file, which in a particular embodiment may be an audio file, and an edge of the plurality of edges represents a weighted summation of a set of similarity factors between a pair of media files connected by the edge. The system is configured to determine the weight associated with each edge of the two connecting nodes based on various similarity factors using the equation (1) as explained with reference to FIG. 3. These weights are utilized by the system to determine the set of overlapping communities.

At 1004, a set of overlapping communities (e.g., $C_1, C_2, \ldots, C_K$) is determined. Each community includes a set of nodes from the plurality of nodes within the graph and each node in the graph belongs to at least one community. An exemplary representation of overlapping communities is explained with reference to FIG. 4.

At 1006, for each node of the plurality of nodes, a community vector is determined. For instance, for each node n, a community vector $V_n$ is determined, where $V_n$ includes K number of elements for the set of overlapping communities.

At 1008, a prediction Y is determined. The prediction Y is also a K element vector, and it indicates the probability of the ideal node (which is to be recommended to the user) being a member of each of the respective communities.

In an example of K being the total number of communities in the user's songs network, a K-element prediction Y specifies the prediction of the ideal song (which is to be recommended to the user) belonging to each of the K communities. For example, each element in the prediction Y is a prediction value (for example, a number between 0 and 1) that specifies the probability of the ideal song (which is to be recommended to the user) belonging to the corresponding community. The prediction Y can be represented as follows:

$$Y=[p_1, p_2, \ldots, p_k] \quad (2)$$

where $p_i$ represents the prediction value associated with the ideal song (which is to be recommended to the user) belonging to community $C_i$.

In at least one embodiment, the prediction Y is determined by training a machine learning model based on the plurality of contextual features associated with the user and the user's past data samples generated based on the music listening patterns. The processing system 110 is configured to determine one or more models or a combination of models suitable for training the machine learning, such as, but not limited to, neural networks, decision trees, regression models, and the like. The K-element prediction Y specifies the machine learning model's prediction of the song (which is to be recommended to the user) belonging to each of the K communities by taking the values of the contextual information of the user as input in the form of an input vector X.

In an embodiment, the prediction Y is determined by training a machine learning model using the user's previous data points and inputting the user's current contextual information to the trained model to get the desired Y. In one example embodiment, the machine learning model is trained by the processing system 110 based on receiving one or more user preferences associated with the plurality of media files. The one or more preferences include liking and disliking of songs provided by the user (such as the user 102/the user 104/user 106) through the UI of the user device (such as any of the corresponding user devices 108 *a-c*) for the media files. It is understood that a liked song is fed with a positive weight and a disliked song is fed with a negative weight for computing the prediction.

At 1010, the method 1000 includes computing a probability distribution (e.g., PD1) over the plurality of media files. The probability distribution is computed using one or more criteria. In this embodiment, example of the one or more criteria is a closeness measure between a community vector V of individual nodes and the prediction Y. It is to be noted that the probability distribution is computed over all of the media files, which means the probability distribution includes normalized probability values for all of the media files. Herein, a probability value of an individual media file (say node n) depends on a closeness measure between the community vector $V_n$ for the node n representing the individual media file and the computed prediction Y.

The closeness measure between the community vector and the prediction vector can be computed in many suitable ways. Without limiting to the scope of present disclosure, the closeness measure may be computed by performing a dot product comparison between the two vectors V and Y to compute the closeness measure between both. The closeness measures across all the songs are then normalized to provide a probability distribution over the plurality of the songs.

It will be appreciated by those skilled in the art that usage of the set of overlapping communities (e.g., community vectors for songs) in determination of the PD1 (also in PD2 described with reference with FIG. 10B) has many benefits, and such benefits are even more pronounced when there is a large number of songs in the user's library. For instance, consider an example scenario (not in accordance with any embodiment of present disclosure) where the concept of community vector is not used. In this example scenario, a machine learning model would simply be predicting the probability of each song, and such operation is computationally intensive if the number of songs are in the range of thousands or more. It would be apparent to those skilled in the art that training such a model would yield a lot of noise, inaccuracies and bias. On the other hand, with the embodiments of present disclosure utilizing the concept of overlapping communities, the number of communities are typically a fraction of the total number of songs. Usage of the overlapping communities enables the system to make use of relationships (e.g., similarity in at least some parameters) between songs for computation of the probability distribution. More specifically, under the model proposed by the present disclosure (e.g., community-structured model), for computing a probability value for a song n in the probability distribution, data points related to other songs in the one or more communities of the song n are also used effectively to provide increase accuracy in a less computationally intensive process. However, in the example scenario (not in accordance with any embodiment of present disclosure), a probability value for every song would only benefit from data points corresponding to that song, leading to an ineffective process.

Further, some embodiments of the present invention use the concept of overlapping communities rather than simple distinct communities, and this can result into almost unique community vectors (calculated at operation 1056) for songs, thereby alleviating any ambiguity in ranking of songs. The benefits of the overlapping communities as compared to distinct communities can be explained with the following example.

Consider an example of a network of four songs S1, S2, S3, and S4. In this example, two distinct communities C1 and C2 are created, where C1 includes S1 and S2 and C2 includes S3 and S4. The community vectors for songs in this example scenarios are as follows:

$$S1=[1,0], S2=[1,0], S3=[0,1], S4=[0,1] \quad (3)$$

It is evident from the above community vectors that S1 and S2 have the same community vector, and S3 and S4 also have the same community vector. In this example, the prediction vector yields Y=[0.5, 0] for both S1 and S2. Hence, S1 and S2 would always yield the same rank/probability in the ranking of songs, and it leads to confusion as to which is a higher ranked song among S1 and S2, and also ambiguity in deciding which song should be recommended first to the user.

Now, considering a use case of the overlapped community, two more communities—C3 including S1 and S3 and C4 including S2 and S4 are introduced in addition to already existing communities C1 and C2. The community vectors for songs in this scenario (e.g., as per at least one embodiment of present disclosure) are as follows:

$$S1=[1,0,1,0], S2=[1,0,0,1], S3=[0,1,1,0], S4=[0,1,0,1] \quad (4)$$

It is evident from the above community vectors that each song now has its own unique community vector, which rectifies the same-rank problem as present in the example scenario that used non-overlapping communities.

Second Method of Computation of Probability Distribution

Another embodiment of computation of probability distribution includes computing the prediction Y that takes into account the recent songs that the user liked/disliked and the community vectors associated with those songs. In this embodiment, the prediction Y is updated whenever the user accesses the songs and a like/dislike input associated with the one or more songs is received from the user. This method utilizes information about the recently played songs and not the user's current contextual information to make a prediction. The existence of communities allows this method to learn the relationship among the songs based on a wide variety of factors and to make a prediction based on those relationships and the songs that were recently played. This method is explained with reference to FIG. 10B.

FIG. 10B is a flow diagram of a second method 10100 for computing a probability distribution (PD2) over a plurality of media files, in accordance with an example embodiment of the present disclosure.

The method 1050 includes the operations 1052, 1054 and 1056, which are same as the operations 1002, 1004 and 1006, respectively.

At operation 1058, the method 1050 includes determining prediction vector Y. Herein, the prediction Y is determined based on a criteria including information of recent song(s) that are played. In an embodiment, every time a song is liked/disliked by the user, the prediction vector Y is updated. The prediction vector Y, at any given time instant i may be termed as Y(i). In one embodiment, if the system (e.g., system 110) detects that the user has not listened to any songs for a predetermined time-period, the system initializes the prediction Y to zeros (e.g., Y(i)=0). All of the information such as whether the user listened to the audio file or user provided his like/dislike input for the audio file, are readily available to the system in form of data samples (e.g., step 202 described reference to FIG. 2). In an embodiment, at the current time step i, the prediction vector Y(i) for a node corresponding to an audio file at a time step i is determined (or updated) based on following equation:

$$Y^{(i)} = (\alpha m V^{(i-1)}) + ((1-\alpha) Y^{(i-1)}) \quad (5)$$

In the above equation (5), a is a predetermined scalar value. For example, a is in the range [0, 1] and optimally chosen by the processing system 110. It is understood that the optimal value of a can be different from user to user. Further, a can be different even in different situations for the same user as detected by the processing system 110. Further, in the above equation (5), m is either a positive or a negative scalar value based on whether the song listened to at a time step i-1 was liked or disliked by the user through the UI of the user device, respectively.

Accordingly, Y(i) e.g., the prediction vector is updated at each time step i based on the community vector V associated with the audio file the user listened to at the time step i-1, and the updated Y(i) is used for the calculation of the probability distribution over the plurality of songs.

At operation 1060, the method 1050 includes computing a probability distribution (e.g., PD2) over the plurality of media files. The probability distribution is computed using one or more criteria. In this embodiment, example of the one or more criteria is a closeness measure between a community vector (V) of individual nodes and the prediction vector Y(i), where Y(i) is computed based at least on information of the recent playback of songs and user's input such as whether user has liked or disliked the song.

Figure 11:
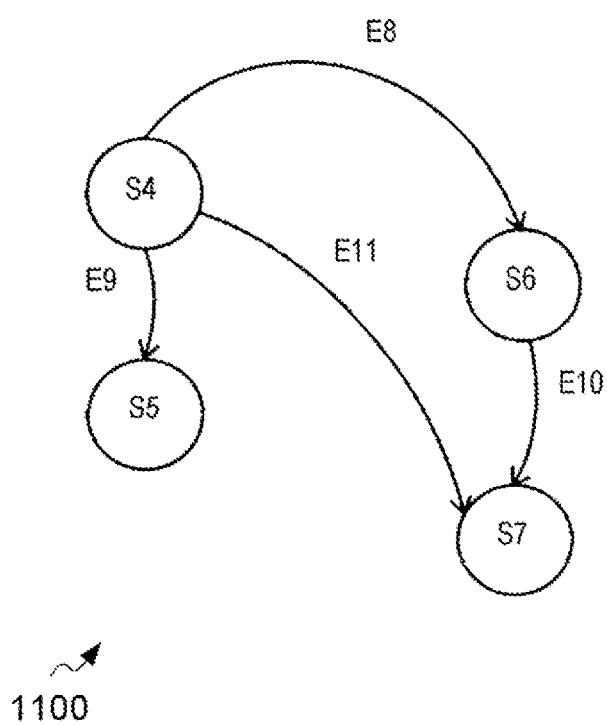
FIG. 11 shows a simplified representation of a directed graph formed using a plurality of nodes and a plurality of edges, in accordance with an example embodiment.

FIG. 11 shows a simplified representation of a directed graph 1100 formed using a plurality of nodes and a plurality of edges, in accordance with an example embodiment of the present disclosure. In at least one embodiment, the processing system 110 is configured to form the directed graph 1100 for arranging the plurality of songs based on a specific order. As shown, the directed graph 1100 includes a plurality of nodes such as S4, S5, S6 and S7 representing corresponding songs and a plurality of directed edges such as E8, E9, E10 and E11 connecting the pair of nodes. It is noted that a directed edge between two nodes (songs) represents that the two songs were played and liked during a predefined time interval and the direction of the edge indicates the node that the edge originates from is the song that was played before the second node/second song. For example, edge E8 represents song S4 was played before song S6, edge E9 represents song S4 was played before song S5, edge E10 represents song S6 was played before song S7 and edge E11 represents song S4 was played before song S7. The processing system 110 is also configured to associate a weight attribute with each of the plurality of edges E8-E11 based on the time lapse between the two songs. In one example embodiment, the weight is a value between 0 and 1. The weight associated with each edge is utilized by the processing system 110 to determine a successive score for each song to measure successiveness to a song listened to at a preceding time step based on the directed graph.

FIG. 12 is another flow diagram of a method 1200 for computing a probability distribution (PD4) over a plurality of media files, in accordance with an example embodiment of the present disclosure. The various steps and/or operations of the flow diagram, and combinations of steps/operations in the flow diagram, may be implemented by, for example, hardware, firmware, a processor, circuitry and/or by the processing system 110 of FIG. 1 and by a combination of a user device associated with a user and the processing system 110 and/or by a different electronic device associated with the execution of software that includes one or more computer program instructions. The steps and/or operations of the method 1200 are not necessarily performed in a sequence, and they may be performed simultaneously or in a different sequence than that of shown in FIG. 12. Further, some steps and/operations may have a plurality of sub-steps, or even some of the steps/operations may be performed together in a joint manner.

At 1202, a directed graph is formed using a plurality of nodes and a plurality of directed edges. Each node represents an audio file and a directed edge from the plurality of directed edges originating from a first node to a second node represents a first audio file corresponding to the first node being played before a second audio file corresponding to the second node. In an embodiment, all the nodes that form the directed graph, represent audio files (songs) that are liked by the user. The system (e.g., the processing system 110) is configured to form a directed graph such as the directed graph 700 of the plurality of nodes (S4-S8) and the plurality of directed edges (E8-E11) as explained with reference to FIG. 7.

At 1204, a weight is assigned to each directed edge based on time lapse between a playback of the first audio file and a playback of the second audio file. Herein, weight assigned to a directed edge is normalized between 0 and 1.

At 1206, at a time step i, a successive score for each node is determined to measure successiveness to an audio file listened to at a preceding time step i-1 based on the directed graph. In one embodiment, the server system is configured to determine that the user has not listened to any songs for a predefined time-period. A successive score for a node n representing an audio file at a time step i is determined based on the following equation:

$$u_n^{(i)} = \sum_{p=1}^{P_n^{(i)}} \prod_{j=1}^{E_p} w_{(p,j)} \quad (6)$$

In the above equation (6), Pn(i) is a total number of existing simple paths from the songs listened to at time step i to song n. It is noted the processing system 110 is configured not to consider paths with repeated vertices as they already include a desired path with an added loop. The loop path is redundant and therefore is not considered by the processing system 110 for computing the successive score. Also, $E_p$ is a total number of directed edges on a corresponding path p and W(p, j) represents a weight of the jth edge of the path p. As the weight assigned to each directed edge is a scalar value between zero and one (which is the normalized value of the time lapse between a playback of the first song and a playback of the second song), the longer the distance of the path of the corresponding edge, the smaller the value of weight associated to that path.

At 1208, at the time step i, a path score for each node is computed based on the successive score determined at the time step i and a preceding path score computed at the preceding time step i−1. The processing system 110 is configured to initialize each song's path score $r_n$, where n corresponds to the song's node, to zero. A path score for the node n at the time step i is determined based on the following equation:

$$r_n^{(i)} = (\alpha u_n^{(i-1)}) + ((1-\alpha) r_n^{(i-1)}) \quad (7)$$

In the above equation (7), a is a predetermined scalar value. For example, a is in the range [0, 1] and optimally chosen by the processing system 110. It is understood that the optimal value of a can be different from user to user. Further, α can be different in different situations for the same user as detected by the processing system 110.

Further, $u_n$ corresponds to a succession score for the node n, as computed in equation (7).

Further, $r_n(i)$ corresponds to the path score for the node n at the time step i based on the succession score and a path score for the node n of the preceding time step i−1.

At 1210, the probability distribution over the plurality of audio files is computed based on the corresponding path score associated with each audio file at time step i. It is understood that a higher value of $r_n$ would give the node a higher probability value.

Accordingly, the present disclosure offers various ways of calculations of probability distributions over the media files based on different criteria, for example, as explained with reference to FIGS. 3 to 12. For instance, probability distributions PD1, PD2, PD3 (or PD3a, PD3b, PD3c, and PD3d) and PD4 are computed. Each of the probability distributions may have different relative weightage. For example, without limiting to the scope of present disclosure, the PD1 and PD2 may have more weightage as compared to PD4. Such probability distributions are used to create a ranking of the plurality of media files (as described with reference to operation 206 of FIG. 2). Further, the songs are recommended to the user based on the ranking of the media files (explained with reference to 208 of FIG. 2).

System Description

The methods described above are performed by a system that can be part of an external server system. However, in some scenarios, the user device may also have a computationally intensive device and the system can be embodied in such user device. One exemplary description of the system is described with reference to FIG. 13.

Figure 13:
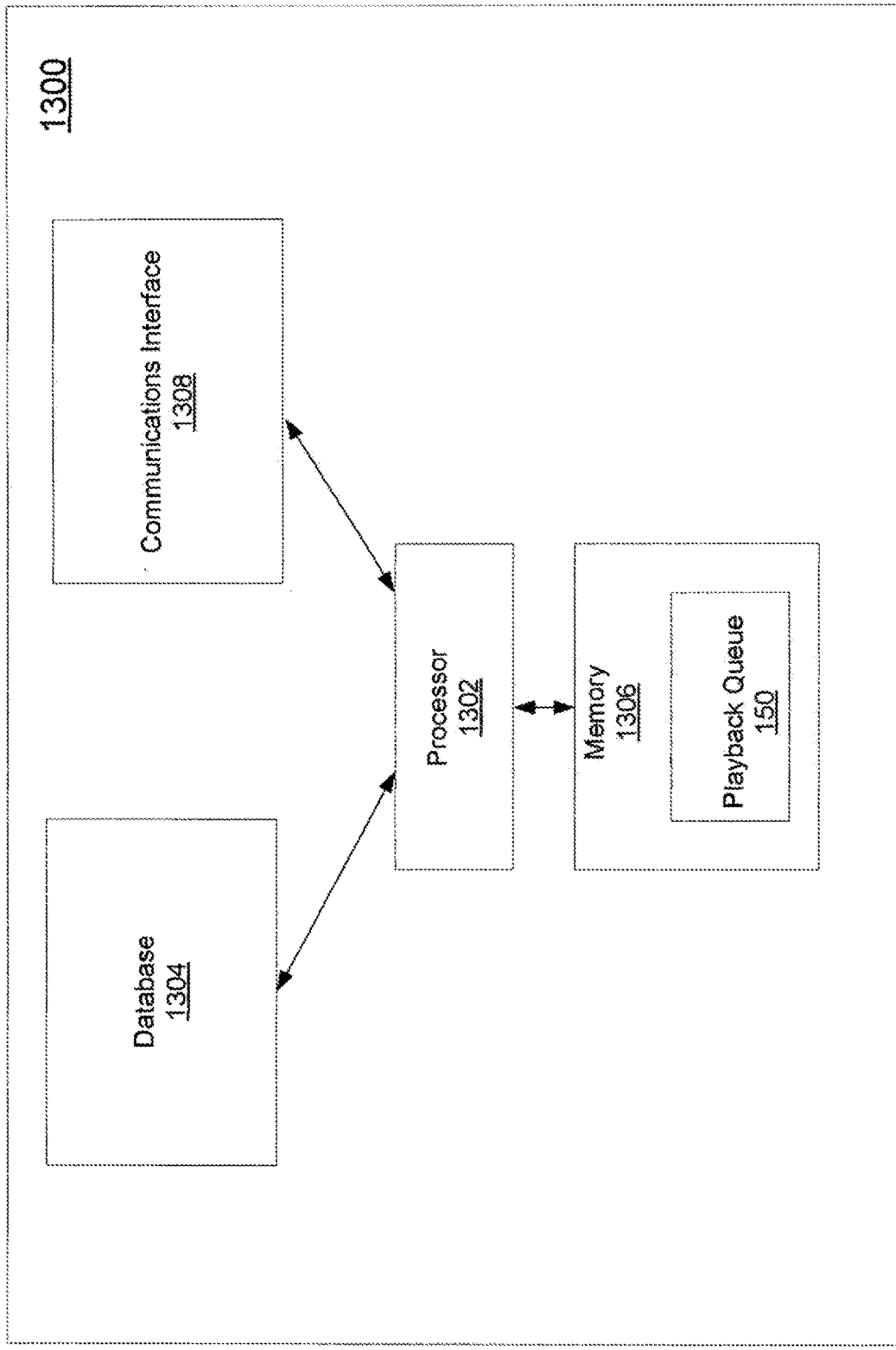
FIG. 13 illustrates a block diagram representation of a system capable of implementing at least some embodiments of the present disclosure.

FIG. 13 shows a block diagram representation of the system 1300 capable of implementing at least some embodiments of the present disclosure. The system 130 includes at least one processor such as a processor 1302, a database 1304, at least one memory such as a memory 1306, and a communication interface 1308. The processor 1302 is communicably coupled with the database 1304, the memory 1306, and the communication interface 1308. In at least one embodiment, the system 1300 may be accessible to one or more user devices (such as the user device 108a-c), through a communication network (e.g., the network 120). It is understood that the system 130 may include fewer or more components than those depicted in FIG. 13 without deviating from the scope of the invention.

In an embodiment, the memory 1306 can be embodied as a part of the processor 1302. The memory 1306 includes machine executable instructions for the MPQ application 150. In various embodiments, the memory 1306 is a storage device embodied as one or more volatile memory devices, one or more non-volatile memory devices, and/or a combination of one or more volatile memory devices and non-volatile memory devices, for storing micro-contents information and instructions. The memory 1306 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY Disc), and semiconductor memories (such as mask ROM, PROM (programmable ROM), EPROM (erasable PROM), flash ROM, RAM (random access memory), etc.).

Further, the processor 1302 is capable of executing the machine executable instructions stored in the memory 1306 for performing one or more operations. It is understood that the processor 1302 can be configured in a variety of ways. For example, the processor 1302 may be embodied as a multi-core processor, a single core processor, or a combination of one or more multi-core processors and one or more single core processors. For example, the processor 1302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The communication interface 1308 is configured to facilitate communication between the system 130 and the user device. The communication may be achieved over a communication net-work (e.g., the network 120). In one embodiment, the communication interface 1308 includes a transceiver for wirelessly communicating information to, or receiving information from, the user device (such as user devices 108a-c of FIG. 1) or other suitable display device, and/or another type of remote processing device. In another embodiment, the communication interface 1308 is capable of facilitating operative communication with the remote devices and a cloud server using API (Application Program Interface) calls. Such communication may be achieved over the communication network such as the network 120.

The database 1304 may be any computer-operated hardware suitable for storing and/or retrieving data, such as, but not limited to storing profile information of a plurality of users, one or more user preferences of the plurality of users. In various embodiments, the database 1304 may include multiple storage units such as hard disks and/or solid-state disks in a redundant array of inexpensive disks (RAID) configuration. The database 1304 may include a storage area network (SAN) and/or a network attached storage (NAS) system. In some alternate embodiments, the database 1304 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc. The system 130 include one or more storage interfaces for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1302 with access to the database 1304.

While some examples are described as being performed on or with the MPQ application 150, in variations, functionality described by various embodiments can be implemented using (i) a plugin application to manage the user's playback queue separate from the media playback application, or (ii) a queue application that is separate from a media playback application. In such variations, a queue management plugin or application can control, direct or otherwise cause a playback application to playback media items, based on a playback queue. Likewise, in some variations, the processing system 150 (e.g., server(s)) can implement functionality by communicating with a queue management plugin or application.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 1300 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

What is claimed is:

1. A computer-implemented method, comprising:
receiving, by a processing system, a plurality of data samples generated from a media application in a user device for a plurality of media files, the media application including (i) a media file being played, and (ii) an ordered queue of upcoming playback media files following the media file being played, the plurality of data samples being based at least in part on a plurality of contextual features associated with a user of the user device in association with a user's interaction with a least one media file of the plurality of media files, the plurality of contextual features being collected utilizing at least one sensing module of or in communication with the user device;
computing, by the processing system, one or more probability distributions based at least in part on the data samples, where at least one of the data samples is associated with an affinity measure m indicative of the user's interaction with the at least one of the plurality of media files, wherein m is in the range $[-\gamma, \gamma]$, whereby $\gamma$ is an arbitrary numerical value assigned by the processing system, wherein a greater value of m indicates a greater affinity of the user for the at least one of the plurality of media files;
determining, by the processing system, a ranking of the plurality of media files based on the one or more probability distributions over the plurality of media files in association with the plurality of data samples;
recommending, by the processing system, one or more media files from the ranking of the plurality of media files to the user at a User Interface (UI) of the user device; and causing the one or more media files to be played back through the UI of the user device.

2. The method of claim 1, wherein the user's interaction with the at least one of the plurality of media files comprises at least one of replacing one or more media files in the ordered queue of upcoming playback media files and modifying an order of media files in the ordered queue of upcoming playback media files.

3. The method of claim 2,
wherein the plurality of data samples generated include (i) at least a data sample for user's interaction with the queue of upcoming playback media items based on a state of the media application before the user's interaction, (ii) a state of the media application after the user's interaction, and (iii) the contextual factors prevailing at a time of the user's interaction,
wherein the contextual factors including at least one of a time of day, a day of week, a weather condition, the user's location, the user's activity, the user's mood, and the user's physiological condition in accordance with at least one of a heart-rate measurement, a body temperature measurement, a blood pressure measurement, or a pulse measurement,
wherein the state of the media application relates to at least one of (i) the media file being played, (ii) media files in the ordered queue of upcoming playback media files, and (iii) a current set of media file recommendations offered by the media application.

4. The method of claim 1, wherein the user interaction of selecting a media item in the ordered queue of upcoming playback media files replaces the media file being played with the selected media item, and replaces media files of the ordered queue of upcoming playback media files with media files that followed the selected media item.

5. The method of claim 2, wherein the application further comprises a collection of media file suggestions offered by the media application and upon the user's interaction, the media application updates at least one current recommendation of the collection of media file suggestions.

6. The method of claim 1 wherein the plurality of data samples includes information feedback of the user's interaction with ones of the plurality of media files, wherein the information feedback comprises at least a like or a dislike of the ones of the plurality of media files.

7. The method of claim 6 wherein the affinity measure m associated with a data sample of the plurality of data samples is based at least in part upon a binary or continuous scoring method in accordance with the user's interaction with a particular media file of the plurality of media files.

8. The method of claim 1, wherein computing a probability distribution of the one or more probability distributions comprises:
forming a graph comprising a plurality of nodes and a plurality of edges, each node representing a distinct media file and an edge of the plurality of edges representing a weighted summation of a set of similarity factors between a pair of distinct media files connected by the edge;
determining a set of overlapping communities, wherein each community comprises a set of nodes from the plurality of nodes within the graph and each node in the graph belongs to at least one community;
determining, for each node of the plurality of nodes, a community vector comprising K number of elements for the set of overlapping communities, K being a number of communities in the set of overlapping communities, wherein an element e of the K number of elements for a node of the plurality of nodes is a scalar measure that denotes the affiliation of the node to the corresponding community, wherein e is in the range [0, 1], wherein a greater value of e corresponds to a greater affiliation of the node to the corresponding community;
determining a prediction vector comprising K number of prediction values, wherein a prediction value of the K number of prediction values represents a probability of an ideal media file belonging to a community corresponding to the prediction value; and
computing the probability distribution over the plurality of distinct media files based on a closeness measure between each of community vectors for the plurality of nodes and the prediction vector.

9. The method of claim 8, wherein the prediction vector is determined based on training a machine learning model that utilizes one or more of the data samples, the contextual factors associated with the user at a time of determining the prediction vector, and the user's media preferences, wherein the user's media preferences comprises one or more affinity measures associated with a particular media file or a classification of the particular media file.

10. The method of claim 9, wherein the affinity measures are based at least in part upon data points based associated with a liking and disliking actions provided by the user at the UI of the user device in association with at least one of the plurality of media files.

11. The method of claim 8, wherein the set of similarity factors is determined based on at least one of: one or more intrinsic features, the one or more intrinsic features comprising factors that naturally define the media item; and one or more non-intrinsic features, the one or more non-intrinsic features comprising factors that are ephemeral and non-defining of the media item.

12. The method of claim 1, wherein computing a probability distribution of the one or more probability distributions comprises:
forming a graph comprising a plurality of nodes and a plurality of edges, each node of the plurality of nodes representing a distinct media file and an edge of the plurality of edges representing a weighted summation of a set of similarity factors between a pair of distinct media files connected by the edge;
determining a set of overlapping communities, wherein each community comprises a set of nodes from the plurality of nodes within the graph and each node in the graph belongs to at least one community;
determining, for each node of the plurality of nodes, a community vector comprising K number of elements for the set of overlapping communities, K being a number of communities in the set of overlapping communities, wherein an element e of the K number of elements for a node of the plurality of nodes is a scalar measure that denotes the affiliation of the node to the corresponding community, wherein e is in the range [0, 1], wherein a greater value of e corresponds to a greater affiliation of the node to the corresponding community;
determining a prediction vector at a time step i based on an equation $$Y^{(i)} = (\alpha m V^{(i-1)}) + ((1-\alpha) Y^{(i-1)})$$

wherein $\alpha$ is a predetermined scalar value,
wherein Y(i) is the prediction vector determined at each time step i based on the community vector V associated with the media item corresponding to the data point at time step i−1, m is the affinity measure corresponding to the data sample of a media file played at the time step i−1; and computing the probability distribution over the plurality of distinct media files based on a closeness measure between each of the community vectors for the plurality of nodes and the prediction vector.

13. The method of claim 12, wherein the set of similarity factors is determined based on at least one of: one or more intrinsic features, the one or more intrinsic features comprising factors that naturally define the media item; and one or more non-intrinsic features, the one or more non-intrinsic features comprising factors that are ephemeral and non-defining of the media item.

14. The method of claim 8, wherein computing a probability distribution of the one or more probability distributions comprises:

forming a directed graph comprising a plurality of nodes and a plurality of directed edges, each node representing a distinct media file and a directed edge from the plurality of directed edges originating from a first node to a second node representing a first media file corresponding to the first node and a second media file corresponding to the second node, wherein the first media file was played for the user of the application before the second media file was played, whereby both media files are played with a positive outcome value of affinity measure m;

assigning a weight, with a scalar value in the range [0,1], to each directed edge based on the time lapse between the time the first media file was played by the user of the application and the time the second media file was played by the user of the media application;

at a time step i, determining a successive score for each node to measure successiveness to a media file corresponding to the node observed at a preceding time step i−1 based on the directed graph;

at the time step i, computing a path score for each node based on the successive score determined at the time step i and a preceding path score computed at the preceding time step i−1; and computing the probability distribution over the plurality of distinct media files based on the corresponding path score associated with each media file at the time step i.

15. The method of claim 14, wherein a successive score for a node n representing a media item at a time step i is determined based on an equation $$u_n^{(i)} = \sum_{p=1}^{P_n^{(i)}} \prod_{j=1}^{E_p} w_{(p,j)}$$

wherein $P_n(i)$ is the total number of existing simple paths from the media item played at time step i to the media item corresponding to the node n, wherein $E_p$ is the total count of edges on the path p, wherein $w(p, j)$ represents the weight of the jth edge of path p.

16. The method of claim 14, wherein a path score for the node n at the time step i is determined based on an equation $$r_n^{(i)} = (\alpha u_n^{(i-1)}) + ((1-\alpha) r_n^{(i-1)})$$

wherein $\alpha$ is a predetermined scalar value; and wherein $u_n$ corresponds to a succession score for the node n; and wherein $r_n$ corresponds to the path score for the node n at the time step i based on the succession score and a path score for the node n at the preceding time step i−1.

17. The method of claim 1, wherein determining the ranking comprises:

assigning weights to each of the one or more probability distributions;

combining the one or more probability distributions based on the assigned weights to compute a score for ones of the plurality of distinct media files; and determining the ranking of the plurality of media files based on the score computed for each media file of the plurality of media files.

18. The method of claim 17, wherein the weights associated with each probability distribution is determined based on training a machine learning model that utilizes one or more of:

the data samples generated by the application, the contextual factors associated with the user of the application at the time of making a determination, the contextual factors including at least one of a time of day, a day of week, a weather condition, the user's location, the user's activity, the user's mood, and the user's physiological condition in accordance with at least one of a heart-rate measurement, a body temperature measurement, a blood pressure measurement, and a pulse measurement, and the user's media preferences, wherein the user's media preferences comprises one or more affinity measures associated with a particular media file or a particular classification of the media file, wherein the affinity measurement is in accordance with one of a binary and a continuous scoring method.

19. A processing system, comprising:

at least one processor;

a communication interface, controlled by the at least one processor, to communicate with a user device associated with a user; and a memory having stored therein machine executable instructions, that when executed by the at least one processor, cause the processing system to perform operations comprising:

receiving, by a processing system, a plurality of data samples generated from an application in a user device for a plurality of media files, the media application including a media file being played and an ordered queue of upcoming playback media files following the media file being played, the plurality of data samples being based at least in part on a plurality of contextual features associated with a user of the user device in association with a user's interaction with a least one media file of the plurality of media files, the plurality of contextual features being collected utilizing at least one sensing module of the user device;

computing, by the processing system, one or more probability distributions based at least in part on the data samples, the plurality of data samples being associated with an affinity measure m indicative of the user's interaction with the at least one of the plurality of media files, wherein m is in the range [−γ, γ], whereby γ is an arbitrary numerical value assigned by the processing system, wherein a greater value of m indicates a greater affinity of the user for the at least one of the plurality of media files;

determining, by the processing system, a ranking of the plurality of media files based on the one or more probability distributions over the plurality of media files in association with the plurality of data samples;

recommending, by the processing system, one or more media files from the ranking of the plurality of media files to the user at a User Interface (UI) of the user device; and playing back the one or more media files through the UI of the user device.

20. A computer program product comprising at least one computer-readable storage medium, the computer-readable storage medium comprising a set of instructions which, when executed by one or more processors, cause a processing system to perform operations comprising:

receiving, by a processing system, a plurality of data samples generated from an application in a user device of for a plurality of media files, the media files including a media file being played and an ordered queue of upcoming playback media files following the media file being played, the plurality of data samples being based at least in part on a plurality of contextual features associated with a user of the user device in association with a user's interaction with a least one media file of the plurality of media files, the plurality of contextual features being collected utilizing at least one sensing module of the user device;

computing, by the processing system, one or more probability distributions based at least in part on the data samples, the plurality of data samples being associated with an affinity measure m indicative of a user's interaction with the at least one of the plurality of media files, wherein m is in the range $[-\gamma, \gamma]$, whereby $\gamma$ is an arbitrary numerical value assigned by the processing system, wherein a greater value of m indicates a greater affinity of the user for the at least one of the plurality of media files;

determining, by the processing system, a ranking of the plurality of media files based on the one or more probability distributions over the plurality of media files in association with the plurality of data samples;

recommending, by the processing system, one or more media files from the ranking of the plurality of media files to the user at a User Interface (UI) of the user device; and playing back the one or more media files through the UI of the user device.

* * * * *